(12) United States Patent
Yamaoka (10) Patent No.: US 11,148,473 B2
(45) Date of Patent: Oct. 19, 2021

(54) TYRE

(71) Applicant: Sumitomo Rubber Industries, Ltd., Kobe (JP)

(72) Inventor: Hiroshi Yamaoka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 202 days.

(21) Appl. No.: 16/359,128

(22) Filed: Mar. 20, 2019

(65) Prior Publication Data

US 2019/0308462 A1 Oct. 10, 2019

(30) Foreign Application Priority Data

Apr. 10, 2018 (JP) .............................. JP2018-075599

(51) Int. Cl.
*B60C 11/03* (2006.01)
*B60C 11/12* (2006.01)

(52) U.S. Cl.
CPC ...... *B60C 11/0304* (2013.01); *B60C 11/0306* (2013.01); *B60C 11/0311* (2013.01); *B60C 11/1204* (2013.01); *B60C 11/1236* (2013.01); *B60C 2011/1209* (2013.01); *B60C 2011/1213* (2013.01)

(58) Field of Classification Search
CPC ............. B60C 11/1222; B60C 11/1204; B60C 11/1236
See application file for complete search history.

(56) References Cited

U.S. PATENT DOCUMENTS

| 4,351,381 A | 9/1982 | Roberts et al. |
| 2007/0163693 A1 | 7/2007 | Suganuma |
| 2014/0238566 A1 | 8/2014 | Takahashi |
| 2016/0303919 A1 | 10/2016 | Yamaoka |
| 2017/0368886 A1 | 12/2017 | Kitani |
| 2018/0079260 A1* | 3/2018 | Suzuki ............... B60C 11/0306 |
| 2018/0354303 A1* | 12/2018 | Kiwaki .................. B60C 11/00 |

FOREIGN PATENT DOCUMENTS

| DE | 202008018041 U1 | 7/2011 |
| JP | 2000-280713 A | 10/2000 |
| JP | 2010-6155 A | 1/2010 |
| JP | 2016-203703 A | 12/2016 |

OTHER PUBLICATIONS

Translation of JP 2010-6155 (Year: 2010).*
Extended European Search Report, dated Jun. 18, 2019, for European Application No. 19161016.1.

* cited by examiner

*Primary Examiner* — Marc C Howell
*Assistant Examiner* — John J DeRusso
(74) *Attorney, Agent, or Firm* — Birch, Stewart, Kolasch & Birch, LLP (57) ABSTRACT

A tyre includes a tread portion including a first land portion having a circumferentially extending first edge and a circumferentially extending second edge on its ground contacting surface. The first land portion is provided with first lateral grooves extending from the first edge and terminating within the first land portion, second lateral grooves extending from the second edge and terminating within the first land portion, and first sipes. Each first sipe extends from a first end thereof opened at the second edge toward the first edge, and turns in a direction within the first land portion to extend to a second end thereof opened at the second edge at a different location from the first end.

19 Claims, 4 Drawing Sheets

TYRE

BACKGROUND ART

Field of the Disclosure

The present disclosure relates to a tyre capable of improving steering stability on dry roads and on-snow performance.

Description of the Related Art

Conventionally, tyres which are designed to improve steering stability on snowy roads (hereinafter, referred to as "on-snow performance") have been proposed. For example, the following Patent document 1 discloses a tyre tread which comprises a land portion divided by circumferentially and continuously extending main grooves. The land portion is provided with a plurality of lug grooves extending from the main grooves and terminating within the land portion and a plurality of sipes.

PATENT DOCUMENT

[Patent document 1] JP2016-203703A1

SUMMARY OF THE DISCLOSURE

Unfortunately, since the tyre disclosed in Patent document 1 comprises the plurality of sipes that traverse the land portion completely, the stiffness of the land portion tends to decrease, and thus there still has been a room for improvement in steering stability on dry roads.

In view of the above problems in the conventional art, the present disclosure has an object to provide a tyre capable of improving steering stability on dry roads and on-snow performance.

According to one aspect of the disclosure, a tyre includes a tread portion including a first land portion having a circumferentially extending first edge and a circumferentially extending second edge on its ground contacting surface. The first land portion is provided with first lateral grooves extending from the first edge and terminating within the first land portion, second lateral grooves extending from the second edge and terminating within the first land portion, and first sipes. Each first sipe extends from a first end thereof opened at the second edge toward the first edge, and turns in a direction within the first land portion to extend to a second end thereof opened at the second edge at a different location from the first end.

In another aspect of the disclosure, the first lateral grooves and the second lateral grooves may be arranged alternately in a tyre circumferential direction.

In another aspect of the disclosure, each first sipe may be arranged between one first lateral groove and one second lateral groove which are adjacent in a tyre circumferential direction.

In another aspect of the disclosure, each first sipe may have a length in a tyre axial direction equal to or more than 50% of an axial width of the first land portion.

In another aspect of the disclosure, each first sipe may include a first sipe element extending from the first end, a second sipe element extending from the second end, and a third sipe element having an angle with respect to a tyre circumferential direction smaller than those of the first sipe element and the second sipe element. In another aspect of the disclosure, the third sipe element may have a length in the tyre circumferential direction smaller than lengths in a tyre axial direction of the first sipe element and the second sipe element. In another aspect of the disclosure, the first sipe element and the second sipe element may extend in parallel with each other. In another aspect of the disclosure, the first sipe element may have an opposite end opposed to the first end, the second sipe element may have an opposite end opposed to the second end, and the third sipe element may connects the opposite end of the first sipe element to the opposite end of the second sipe element.

In another aspect of the disclosure, the first sipe element may have a length in a tyre axial direction smaller than a length in the tyre axial direction of the second sipe element.

In another aspect of the disclosure, lengths in a tyre axial direction of the second lateral grooves may be smaller than lengths in the tyre axial direction of the first lateral grooves.

In another aspect of the disclosure, the first land portion may further be provided with second sipes connecting the first lateral grooves and the second edge, and/or the first land portion may further be provided with third sipes connecting the second lateral grooves and the first edge.

In another aspect of the disclosure, the first land portion may be a middle land portion arranged between a tyre equator and a tread edge, and the first edge is located on the tyre equator side.

In another aspect of the disclosure, the tread portion may have a designated mounting direction to a vehicle, and the middle land portion may be located on an outboard side of a vehicle upon being mounted onto a vehicle.

In another aspect of the disclosure, the tread portion may further include a crown land portion arranged on the tyre equator, wherein the crown land portion is defined between an outboard crown longitudinal groove and an inboard crown longitudinal groove that is adjacent to the middle land portion, and the crown land portion may be provided with first crown lateral grooves extending from the outboard crown longitudinal groove which terminate within the crown land portion, and second crown lateral grooves extending from the inboard crown longitudinal groove which terminate within the crown land portion, and first crown sipes traversing the crown land portion.

In another aspect of the disclosure, the first crown lateral grooves and the second crown lateral grooves may be arranged alternately in the tyre circumferential direction, and axial lengths of the second crown lateral grooves may be equal to axial lengths of the first crown lateral grooves, and the axial lengths of the second crown lateral grooves and the first crown lateral grooves may be equal to or less than 30% of an axial width of the crown land portion.

In another aspect of the disclosure, the crown land portion may further be provided with second crown sipes connecting the first crown lateral grooves and the inboard crown longitudinal groove, and third crown sipes connecting the second crown lateral grooves and the outboard crown longitudinal groove.

In another aspect of the disclosure, the second crown sipes may include second straight sipe elements extending from the inboard crown longitudinal groove straightly, and second curve sipe elements connecting the second straight sipe elements and the first crown lateral grooves in an arc-shaped manner.

In another aspect of the disclosure, the third crown sipes may include third straight sipe elements extending from the outboard crown longitudinal groove straightly, and third curve sipe elements connecting the third straight sipe elements and the second crown lateral grooves in an arc-shaped manner.

In another aspect of the disclosure, the tread portion may further include an inboard middle land portion, wherein the inboard middle land portion may be provided with inboard middle lateral grooves traversing the inboard middle land portion completely.

DESCRIPTION OF THE PREFERRED EMBODIMENTS

Figure 1:
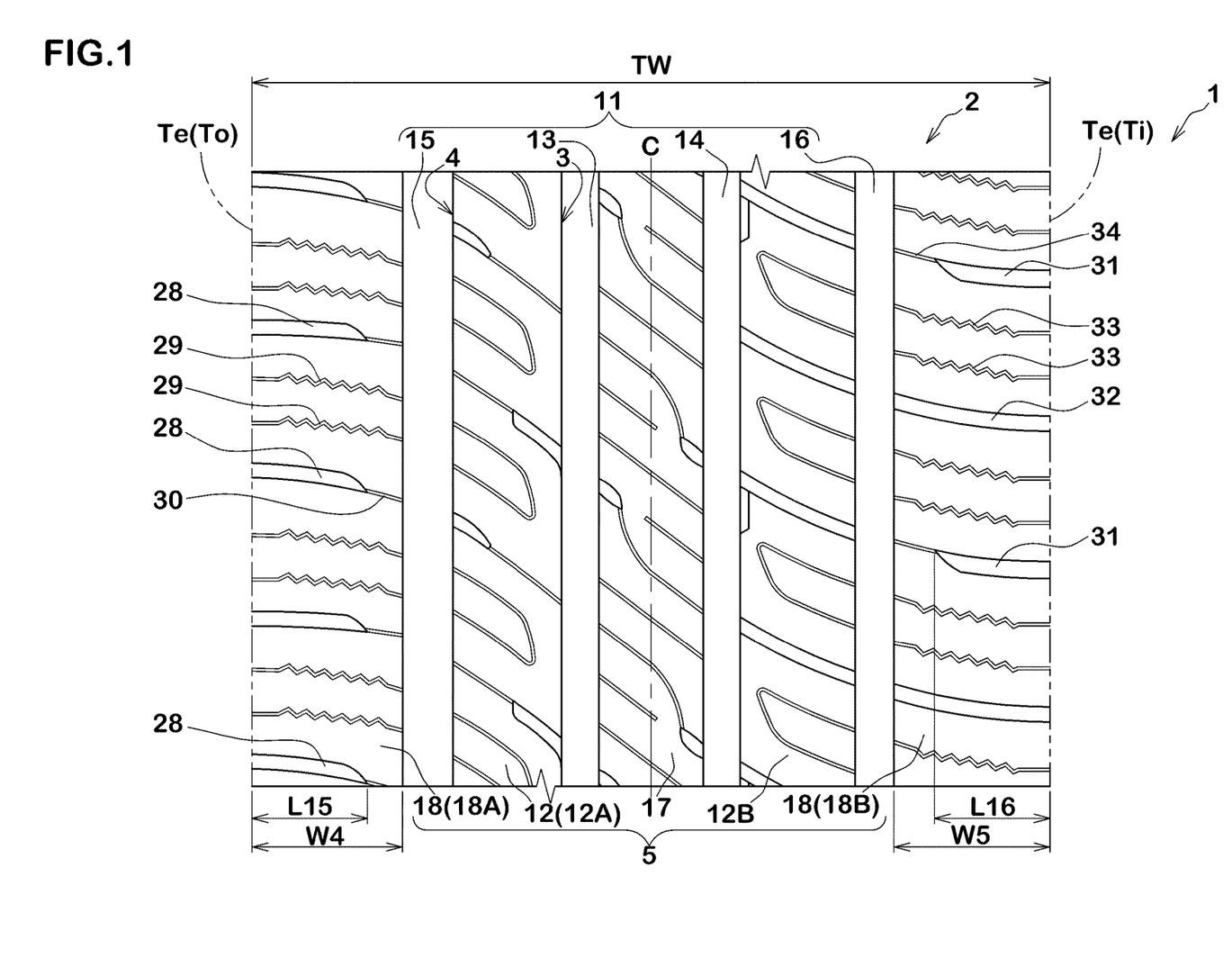
FIG. 1 is a development view of a tread portion of a tyre in accordance with an embodiment of the present disclosure.

An embodiment of the present disclosure will be explained below with reference to the accompanying drawings. FIG. 1 illustrates a development view of a tread portion 2 of a tyre 1 according to an embodiment. The tyre 1 according to the embodiment, for example, can be used for various tyres, e.g., pneumatic tyres for passenger car and heavy-duty vehicle, and non-pneumatic tyres that can support the tyre load by structural members without being inflated with pressurized air. Preferably, the tyre 1 according to the embodiment, for example, is embodied as a passenger car tyre.

As illustrated in FIG. 1, the tyre 1 according to the embodiment includes the tread portion 2 which comes into contact with the ground when traveling. Preferably, the tread portion 2 includes land portions 5 which include a first land portion 12 having a circumferentially extending first edge 3 and a circumferentially extending second edge 4 on its ground contacting surface.

Figure 2:
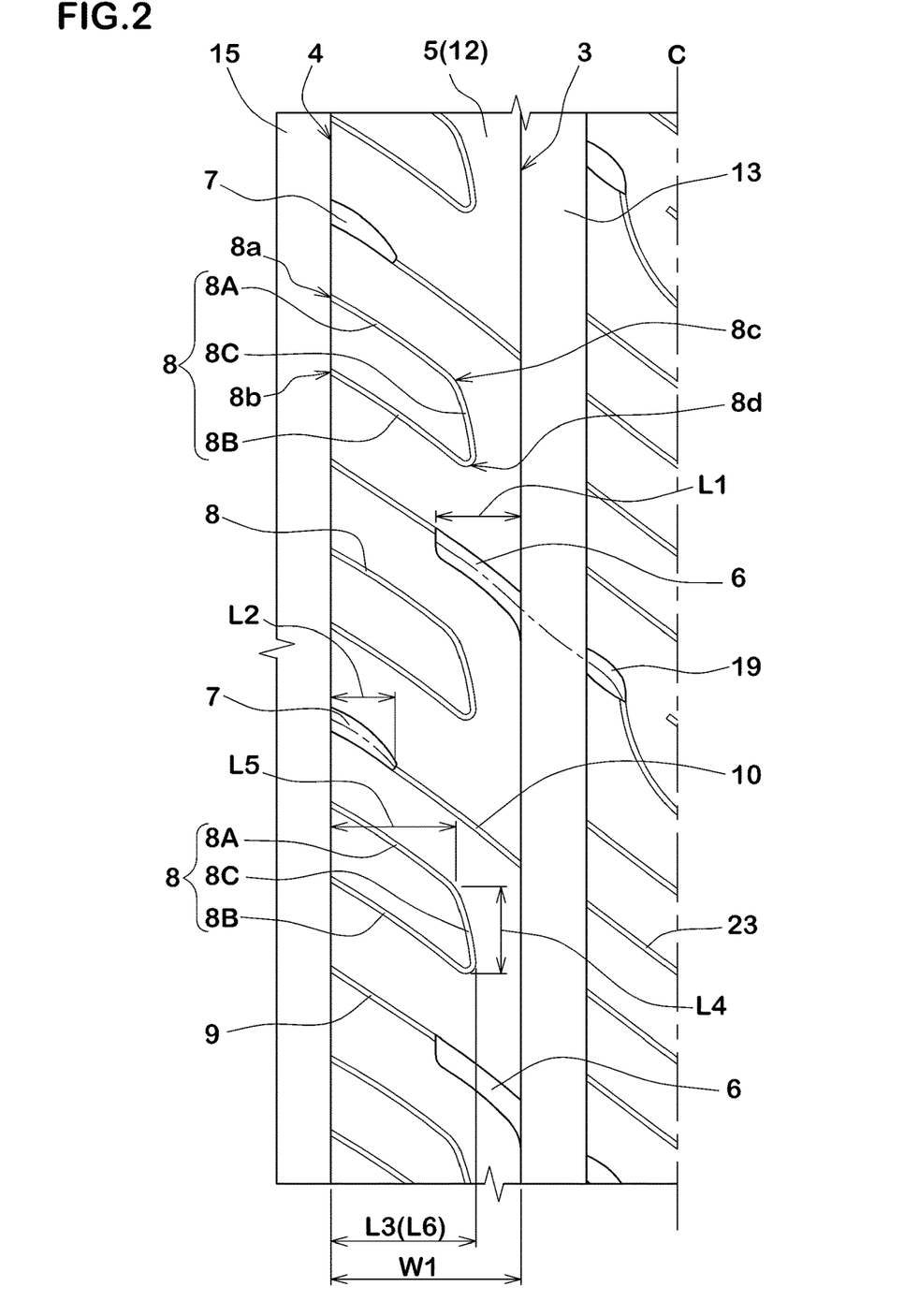
FIG. 2 is an enlarged view of a first land portion (an outboard middle land portion)

FIG. 2 illustrates an enlarged view of the first land portion 12. As illustrated in FIG. 2, the first land portion 12 is provided with first lateral grooves 6 extending from the first edge 3 and terminating within the first land portion 12, second lateral grooves 7 extending from the second edge 4 and terminating within the first land portion 12, and first sipes 8.

In such a first land portion 12, when traveling on snowy roads, the first lateral grooves 6 and the second lateral grooves 7 can compress snow on the ground and shear it, improving on-snow performance of the tyre 1. Further, since the first land portion 12 is not provided with any lateral grooves that traverse the first land portion completely, the first land portion 12 can enhance stiffness thereof to improve steering stability of the tyre 1. Furthermore, the first sipes 8 can provide the edge effect, improving on-snow performance of the tyre 1 further.

Preferably, each first sipe 8 extends from a first end 8a thereof opened at the second edge 4 toward the first edge 3, and turns in a direction within the first land portion 12 to extend to a second end 8b thereof opened at the second edge 4 at a different location from the first end 8a. Such a first sipe 8 does not traverse the first land portion 12 completely and maintains high stiffness of the first land portion 12, improving steering stability of the tyre 1 on dry roads.

For example, the first lateral grooves 6 and the second lateral grooves 7 are arranged alternately in the tyre the tyre circumferential direction. Preferably, axial lengths L2 of the second lateral grooves 7 are shorter than axial lengths L1 of the first lateral grooves 6. Such first lateral grooves 6 as well as second lateral grooves 7 can enhance snow-shearing force on axially inwardly of the first land portion 12, improving on-snow performance of the tyre 1. Further, such a first land portion 12 can exhibit high stiffness on axially outwardly thereof, improving steering stability of the tyre 1.

In this application including specification and claims, various dimensions, positions and the like of the tyre 1 refer to those under a standard condition of the tyre 1 unless otherwise noted. As used herein, the standard condition is such that the tyre 1 is mounted on a standard wheel rim and inflated to a standard pressure but loaded with no tyre load.

As used herein, the standard wheel rim is a wheel rim officially approved or recommended for the tyre 1 by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tyre 1 by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

In this embodiment, a total length (L1+L2) of the axial length L1 of one first lateral groove 6 and the axial length L2 of one second lateral groove 7 is smaller than an axial width W1 of the first land portion 12. This configuration can help to enhance steering stability of the tyre 1 without excessive reduction in stiffness.

Preferably, the first land portion 12 is further provided with second sipes 9 which connect the first lateral grooves 6 and the second edge 4. Further, the first land portion 12 is preferably provided with third sipes 10 which connect the second lateral grooves 7 and the first edge 3. Such second sipes 9 and third sipes 10, while maintaining high stiffness of the first land portion 12, can improve on-snow performance of the tyre 1 by the edge effect.

In this embodiment, each first sipes 8 is arranged between one first lateral groove 6 and one second lateral groove 7 which are adjacent in the tyre circumferential direction. Preferably, an axial length L3 of each first sipe 8 is equal to or more than 50% of the axial width W1 of the first land portion 12. Such a first sipe 8, while maintaining high stiffness of the first land portion 12, can improve on-snow performance of the tyre 1 by the edge effect.

Preferably, each first sipe 8 includes a first sipe element 8A extending from the first end 8a, a second sipe element 8B extending from the second end 8b, and a third sipe element 8C having an angle with respect to the tyre circumferential direction smaller than those of the first sipe element 8A and the second sipe element 8B. In this embodiment, the first sipe element 8A and the second sipe element 8B extend in parallel with each other. The first sipes 8, when traveling on snowy roads, can exert the edge effect in front-back direction by the first sipe elements 8A and the second sipe elements 8B, improving traction. Further, the first sipes 8, when traveling on snowy roads, can exert the edge effect in left-right direction by the third sipe elements 8C, improving cornering performance.

In each first sipe 8, the first sipe element 8A has an opposite end 8c opposed to the first end 8a, the second sipe element 8B has an opposite end 8d opposed to the second end 8b, and the third sipe element 8C connects the opposite end 8c of the first sipe element 8A to the opposite end 8d of the second sipe element 8B. The third sipe element 8C, for example, is inclined with respect to the tyre circumferential direction. The opposite end 8c of each first sipe element 8A as well as the opposite end 8d of each second sipe element 8B are located axially inwardly of axially outer ends of the first lateral grooves 6. Such a first sipe 8 can suppress reduction in stiffness of the first land portion 12, improving steering stability on dry roads of the tyre 1.

Preferably, in each first sipe 8, a length L4 in the tyre circumferential direction of the third sipe element 8C is smaller than an axial length L5 of the first sipe element 8A and an axial length L6 of the second sipe element 8B. Preferably, the axial length L5 of the first sipe element 8A is smaller than the axial length L6 of the second sipe element 8B. In this embodiment, the axial length L6 of the second sipe element 8B corresponds to the axial length L3 of the first sipe 8. Such a first sipe 8 can improve on-snow performance of the tyre 1 by the edge effect.

As illustrated in FIG. 1, in some preferred embodiments, the first edge 3 and the second edge 4 are formed by longitudinal grooves 11 extending in the tyre circumferential direction. The first land portion 12, for example, is a middle land portion arranged between the tyre equator C and one of tread edges Te. In this embodiment, the first edge 3 is located on the tyre equator C side, and the second edge 4 is located on the tread edge Te side.

As used herein, the tread edges Te, when the tyre 1 is a pneumatic tyre, refer to axially outermost edges of the ground contacting patch of the tread portion 2 which occurs under a standard loaded condition when the camber angle of the tyre 1 is zero. Here, the standard loaded condition is such that the tyre 1 is mounted on the standard wheel rim and inflated to the standard pressure and loaded with a standard tyre load. The central location in the tyre axial direction between the tread edges Te corresponds to the tyre equator C.

As used herein, the standard tyre load is a tyre load officially approved or recommended for the tyre 1 by standards organizations, wherein the standard tyre load is the "maximum load capacity" in JATMA, the "Load Capacity" in ETRTO, and the maximum value given in the above-mentioned table in TRA or the like.

In this embodiment, the tread portion 2 has a designated mounting direction to a vehicle such that the tread edges Te include an outboard tread edge To which is intended to be positioned away from the center of a vehicle body and an inboard tread edge Ti which is intended to be positioned toward the center of the vehicle body, upon being mounted to the vehicle. The mounting direction, for example, may be indicated on a sidewall portion of the tyre using letter or mark (not illustrated).

In this embodiment, the tread portion 2 is provided with the longitudinal grooves 11 to define the land portions 5. Each longitudinal groove 11, for example, has a groove width equal to or more than 2% of the tread width TW. Here, the tread width TW is a distance in the tyre axial direction between the tread edges To and Ti under the standard condition.

In this embodiment, the longitudinal grooves 11 include an outboard crown longitudinal groove 13 and an inboard crown longitudinal groove 14 located toward the center of a vehicle body with respect to the outboard crown longitudinal groove 13 upon being mounted on a vehicle. The outboard crown longitudinal groove 13, for example, extends straight continuously in the tyre circumferential direction between the tyre equator C and the outboard tread edge To The inboard crown longitudinal groove 14, for example, extends straight continuously in the tyre circumferential direction between the tyre equator C and the inboard tread edge Ti.

Further, in this embodiment, the longitudinal grooves 11 can include an outboard shoulder longitudinal groove 15 which is away from the center of a vehicle body upon being mounted on a vehicle and an inboard shoulder longitudinal groove 16 which is located toward the center of a vehicle body with respect to the inboard crown longitudinal groove 14 upon being mounted on a vehicle. The outboard shoulder longitudinal groove 15, for example, extends straight continuously in the tyre circumferential direction between the outboard crown longitudinal groove 13 and the outboard tread edge To. The inboard shoulder longitudinal groove 16, for example, extends straight continuously in the tyre circumferential direction between the inboard crown longitudinal groove 14 and the inboard tread edge Ti.

The land portions 5, for example, include a crown land portion 17 arranged on the tyre equator C, two shoulder land portions 18 arranged the tread edges Te, and middle land portions each arranged between the crown land portion 17 and a respective one of the shoulder land portions 18. In this embodiment, the first land portion 12 is embodied as one of the middle land portions.

Figure 3:
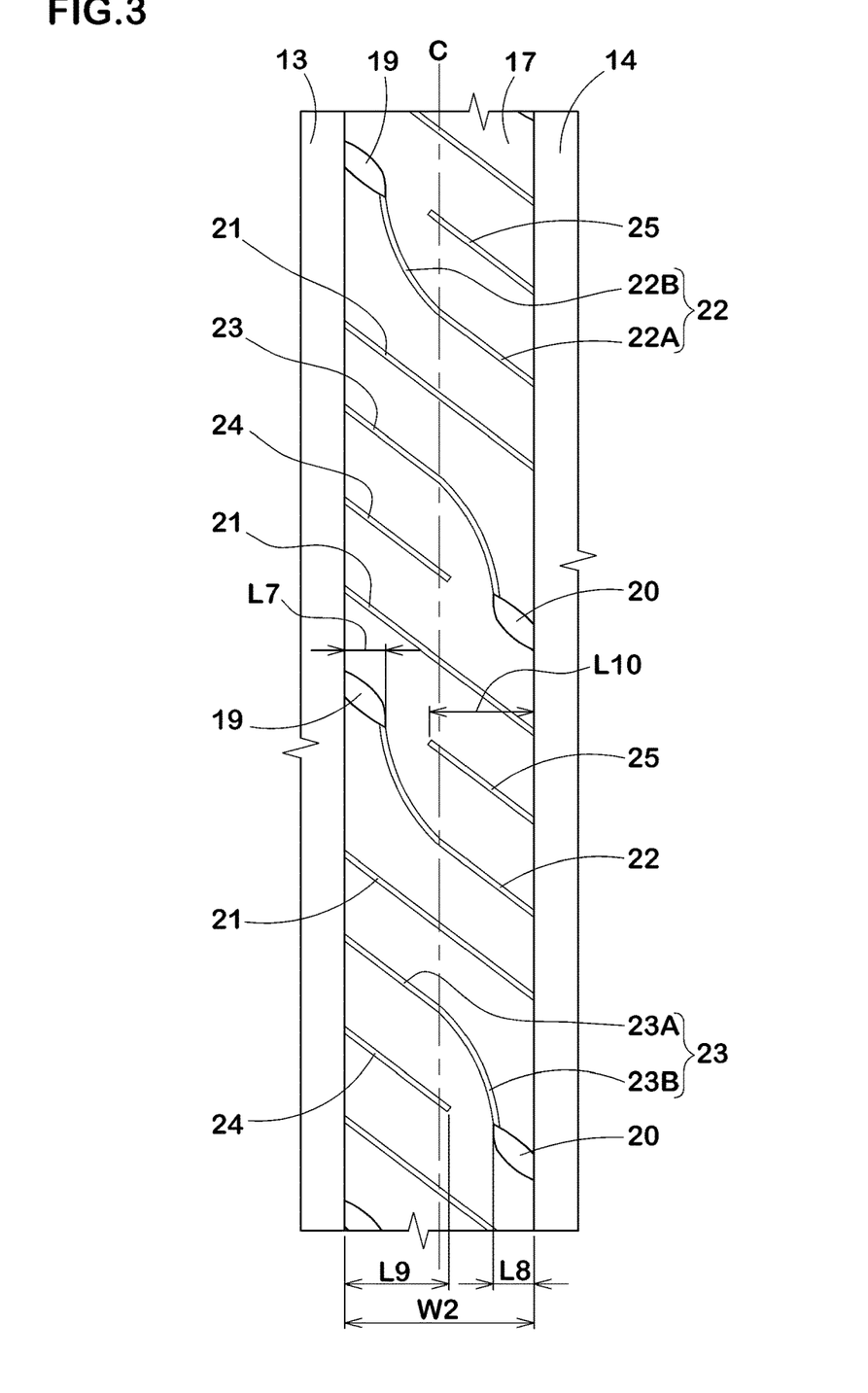
FIG. 3 is an enlarged view of a crown land portion.

FIG. 3 illustrates a partial enlarged view of the crown land portion 17. As illustrated in FIG. 3, the crown land portion 17, for example, is defined between the outboard crown longitudinal groove 13 and the inboard crown longitudinal groove 14. In some preferred embodiment, the crown land portion 17 is provided with first crown lateral grooves 19 extending from the outboard crown longitudinal groove 13, second crown lateral grooves 20 extending from the inboard crown longitudinal groove 14, and first crown sipes 21 traversing the crown land portion 17 completely. Preferably, the first crown lateral grooves 19 and the second crown lateral grooves 20 terminate within the crown land portion 17.

The crown land portion 17, when traveling on snowy roads, can improve on-snow performance of the tyre 1 since the first crown lateral grooves 19 and the second crown lateral grooves 20 compress snow beneath thereof and shear it. Further, since the crown land portion 17 is not provided with any lateral grooves that traverse the crown land portion 17 completely, the crown land portion 17 can maintain sufficient stiffness, improving steering stability of the tyre 1. Furthermore, the first crown sipes 21 can improve on-snow performance of the tyre 1 by the edge effect.

The first crown lateral grooves 19 and the second crown lateral grooves 20, for example, are arranged alternately in the tyre circumferential direction. Preferably, axial lengths L8 of the second crown lateral grooves 20 are substantially same as axial lengths L7 of the first crown lateral grooves 19. The axial lengths L7 of the first crown lateral grooves 19 as well as the axial lengths L8 of the second crown lateral grooves 20 are preferably equal to or less than 30% of an axial width W2 of the crown land portion 17. Such a crown land portion 17 can maintain high stiffness thereof, improving steering stability of the tyre 1 on dry roads.

In some preferred embodiments, the crown land portion 17 is further provided with second crown sipes 22 which connect the first crown lateral grooves 19 and the inboard crown longitudinal groove 14, and third crown sipes 23 which connect the second crown lateral grooves 20 and the outboard crown longitudinal groove 13. The second crown sipes 22 as well as the third crown sipes 23, while maintaining high stiffness of the crown land portion 17, can improve on-snow performance of the tyre by the edge effect.

Each second crown sipe 22, for example, includes a second straight sipe element 22A extending straight from the inboard crown longitudinal groove 14 and a second curve sipe element 22B connecting the second straight sipe element 22A and one first crown lateral groove 19 in an arc-shaped manner. Preferably, the second straight sipe element 22A and the first crown sipes 21 extend in parallel with each other. Such second crown sipes 22 can exert the edge effect in front-back direction, improving on-snow performance of the tyre 1 further.

Each third crown sipe 23, for example, includes a third straight sipe element 23A extending straight from the outboard crown longitudinal groove 13, and a third curve sipe element 23B connecting the third straight sipe element 23A and one second crown lateral groove 20 in an arc-shaped manner. Preferably, the third straight sipe element 23A and the first crown sipes 21 extend in parallel with each other. Such third crown sipes 23 can exert the edge effect in front-back direction, improving on-snow performance of the tyre 1 further.

In this embodiment, the first crown sipes 21 are arranged such that one is located between one first crown lateral groove 19 and one second crown lateral groove 20 which are adjacent with each other in the tyre circumferential direction. Preferably, the first crown sipes 21 extend straight. Such first crown sipes 21, while maintaining proper stiffness of the crown land portion 17, can exert the edge effect, improving on-snow performance of the tyre 1 further.

Preferably, the crown land portion 17 is further provided with fourth crown sipes 24 which extend from the outboard crown longitudinal groove 13 and terminate within the crown land portion 17, and fifth crown sipes 25 which extend from the inboard crown longitudinal groove 14 and terminate within the crown land portion 17.

Preferably, axial lengths L9 of the fourth crown sipes 24 and axial lengths L10 of the fifth crown sipes 25 are equal to or more than 50% of the axial width W2 of the crown land portion 17. The fourth crown sipes 24 and the fifth crown sipes 25, while maintaining high stiffness of the crown land portion 17, can improve no-snow performance of the tyre 1 by the edge effect.

As illustrated in FIG. 2, preferably, the first crown lateral grooves 19 are arranged such that the respective first crown lateral grooves 19 are continuous to the respective first lateral grooves 6 smoothly through the outboard crown longitudinal groove 13. In this embodiment, the respective first crown lateral grooves 19 are aligned with the respective extension lines of first lateral grooves 6. Such first crown lateral grooves 19 can improve on-snow performance of the tyre 1 in cooperation with the first lateral grooves 6.

Preferably, the third crown sipes 23 are arranged such that the third crown sipes 23 are continuous to the third sipes 10 smoothly through the outboard crown longitudinal groove 13. Such a combination of the third sipes 10 and the third crown sipes 23 can help to provide better stiffness distribution in the tread portion 2, and thus steering stability on dry roads can further be improved.

As illustrated in FIG. 1, the middle land portions include an outboard middle land portion 12A defined between the outboard crown longitudinal groove 13 and the outboard shoulder longitudinal groove 15, and an inboard middle land portion 12B defined between the inboard crown longitudinal groove 14 and the inboard shoulder longitudinal groove 16.

As illustrated in FIG. 1 and FIG. 2, the first land portion 12 having the first edge 3 and the second edge 4 is embodied as the outboard middle land portion 12A that is intended to be located away from the center of a vehicle body of a vehicle upon being mounted on the vehicle. Thus, the outboard middle land portion 12A according to the embodiment is provided with the first lateral grooves 6, the second lateral grooves 7, the first sipes 8, the second sipes 9 and the third sipe 10.

Figure 4:
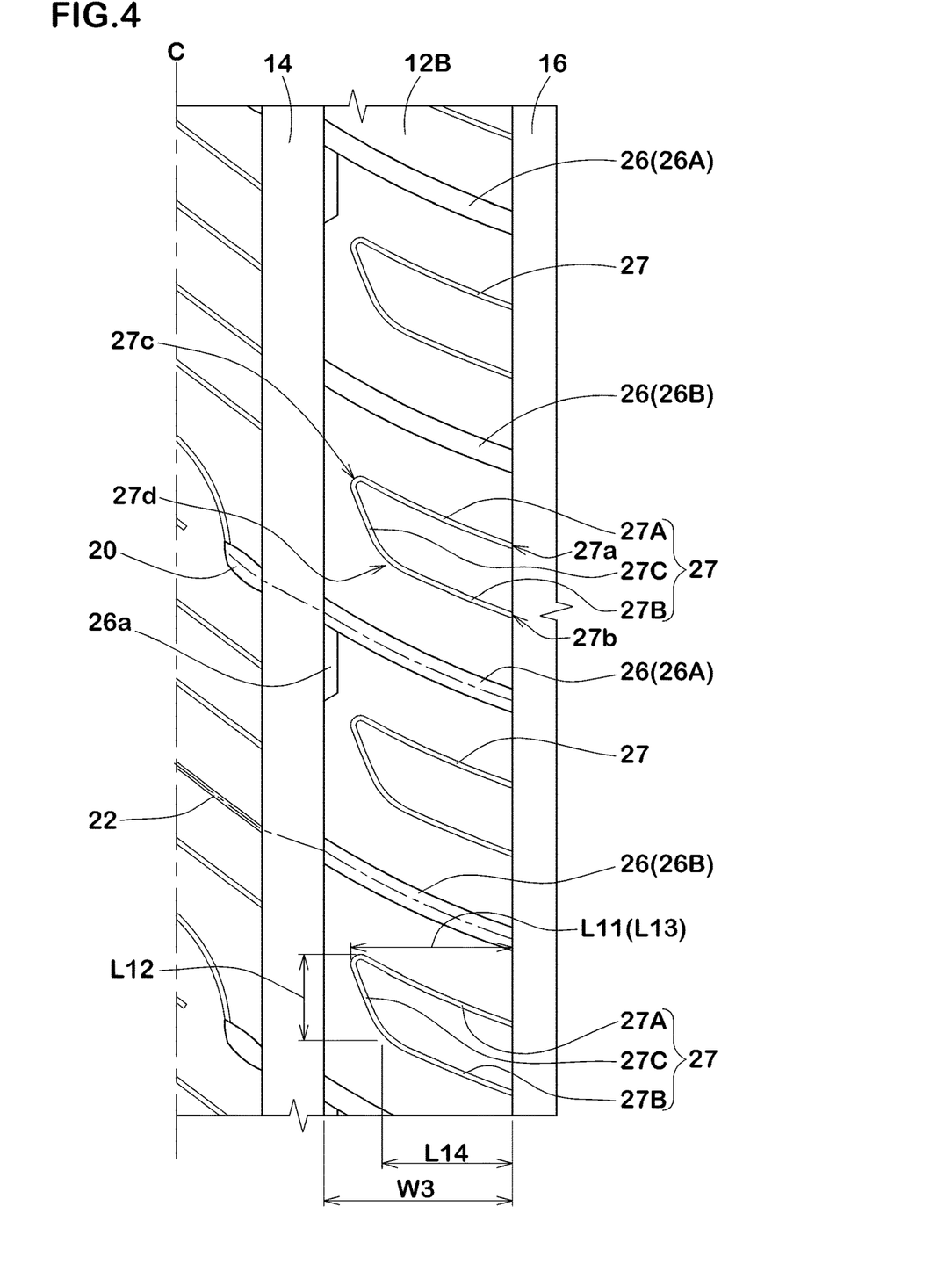
FIG. 4 is an enlarged view of an inboard middle land portion.

FIG. 4 illustrates a partial enlarged view of the inboard middle land portion 12B. As illustrated in FIG. 4, the inboard middle land portion 12B according to the embodiment is provided with inboard middle lateral grooves 26 traversing the inboard middle land portion 12B completely and inboard sipes 27 each of which has two ends that are opened at the inboard shoulder longitudinal groove 16.

Upon traveling on snowy roads, the inboard middle lateral grooves 26 can compress snow therein and then shear them to generate powerful snow traction, improving on-snow performance of the tyre 1. Further, the inboard sipes 27, due to the edge effect, can improve on-snow performance of the tyre 1.

The inboard middle lateral grooves 26, for example, include the first inboard middle lateral grooves 26A and the second inboard middle lateral grooves 26B. In this embodiment, the first inboard middle lateral grooves 26A are provided with chamfered portions 26a on the inboard crown longitudinal groove 14 side. Preferably, each second inboard middle lateral groove 26B has a constant groove width from the inboard crown longitudinal groove 14 to the inboard shoulder longitudinal groove 16. The first inboard middle lateral grooves 26A and the second inboard middle lateral grooves 26B, for example, are arranged alternately in the tyre circumferential direction.

Preferably, the first inboard middle lateral grooves 26A are arranged such that the respective first inboard middle lateral grooves 26A are continuous to the respective second crown lateral grooves 20 smoothly through the inboard crown longitudinal groove 14. In this embodiment. the respective extensions of groove centerlines of first inboard middle lateral grooves 26A are aligned with the respective extensions of groove centerlines of second crown lateral grooves 20. The first inboard middle lateral grooves 26A as such can improve on-snow performance of the tyre 1 in cooperation with the second crown lateral grooves 20.

Preferably, the second inboard middle lateral grooves 26B are arranged so as to be continuous to the second crown sipes 22 smoothly through the inboard crown longitudinal groove 14. Such a combination of the second inboard middle lateral grooves 26B and the second crown sipes 22 can help to provide better stiffness distribution in the tread portion 2, and thus steering stability on dry roads can further be improved.

In this embodiment, each inboard sipe 27 is arranged between one first inboard middle lateral groove 26A and one second inboard middle lateral groove 26B which are adjacent with each other in the tyre circumferential direction. Preferably, axial length L11 of the inboard sipes 27 are equal to or more than 50% of an axial width W3 of the inboard middle land portion 12B. The inboard sipes 27, while maintaining sufficient stiffness of the inboard middle land portion 12B, can offer edge effect thereof, improving on-snow performance of the tyre 1.

Each inboard sipe 27, for example, includes a first inboard end 27a opened at the inboard shoulder longitudinal groove 16 and a second inboard end 27b opened at the inboard shoulder longitudinal groove 16 at a different location from the first inboard end 27a. Preferably, each inboard sipe 27 extends from the first inboard end 27a toward the inboard crown longitudinal groove 14 and then turns back to the second inboard end 27b without reaching the inboard crown longitudinal groove 14. Since such an inboard sipe 27 does not traverse the inboard middle land portion 12B completely, high stiffness of the inboard middle land portion 12B can be maintained, improving steering stability of the tyre 1 on dry roads.

Preferably, each inboard sipe 27 includes a first inboard sipe element 27A extending from the first inboard end 27a, a second inboard sipe element 27B extending from the second inboard end 27b, and a third inboard sipe element 27C connecting the first inboard sipe element 27A and the second inboard sipe element 27B. In this embodiment, the first inboard sipe element 27A and the second inboard sipe element 27B extend in parallel with each other. Preferably, the third inboard sipe element 27C is smaller in angle with respect to the tyre circumferential direction than the first inboard sipe element 27A and the second inboard sipe element 27B.

Thus, each inboard sipe 27, when traveling on snowy roads, can provide edge effect in the front-back direction by the first inboard sipe element 27A and the second inboard sipe element 27B, improving traction performance. Also, each inboard sipe 27, due to the third inboard sipe element 27C, can provide edge effect in the right-left direction, improving cornering performance.

In each inboard sipe 27 according to the embodiment, the first inboard sipe element 27A has an opposite end 27c opposed to the first inboard end 27a, the second inboard sipe element 27B has an opposite end 27d opposed to the second inboard end 27b, and the third inboard sipe element 27C connects the opposite end 27c of the first inboard sipe element 27A and the opposite end 27d of the second inboard sipe element 27B. The third inboard sipe element 27C, for example, is inclined with respect to the tyre circumferential direction. The inboard sipes 27 as such can suppress reduction in stiffness of the inboard middle land portion 12B, improving steering stability of the tyre 1 on dry roads.

Preferably, a length L12 in the tyre circumferential direction of the third inboard sipe element 27C is smaller than an axial length L13 of the first inboard sipe element 27A as well as an axial length L14 of the second inboard sipe element 27B. Preferably, the axial length L13 of first inboard sipe element 27A is longer than the axial length L14 of the second inboard sipe element 27B. In this embodiment, the axial length L13 of the first inboard sipe element 27A corresponds to the axial length L11 of the inboard sipe 27. The inboard sipes 27 can provide the edge effect, improving on-snow performance of the tyre 1 further.

As illustrated in FIG. 1, the shoulder land portions 18 preferably include an outboard shoulder land portion 18A defined between the outboard shoulder longitudinal groove 15 and the outboard tread edge To, and an inboard shoulder land portion 18B defined between the inboard shoulder longitudinal groove 16 and the inboard tread edge Ti.

The outboard shoulder land portion 18A, for example, is provided with outboard shoulder lateral grooves 28 and first outboard shoulder sipes 29. In this embodiment, two first outboard shoulder sipes 29 are provided in each region between two outboard shoulder lateral grooves 28 which are adjacent in the tyre circumferential direction.

The outboard shoulder lateral grooves 28, for example, extend axially inwardly from the outboard tread edge To and terminate within the outboard shoulder land portion 18A. In this embodiment, the outboard shoulder lateral grooves 28 have axial lengths L15 in a range of from 65% to 80% of an axial width W4 of the outboard shoulder land portion 18A. The outboard shoulder lateral grooves 28 can improve steering stability of the tyre 1 and on-snow performance in a well-balanced manner.

Preferably, the outboard shoulder land portion 18A is further provided with second outboard shoulder sipes 30 connecting the outboard shoulder lateral grooves 28 and the outboard shoulder longitudinal groove 15. The second outboard shoulder sipes 30, while maintaining high stiffness of the outboard shoulder land portion 18A, can improve on-snow performance of the tyre 1 by the edge effect.

The first outboard shoulder sipes 29, for example, extend axially inwardly from the outboard tread edge To and are connected to the outboard shoulder longitudinal groove 15. Thus, the first outboard shoulder sipes 29 according to the embodiment traverse the outboard shoulder land portion 18A completely.

Each first outboard shoulder sipe 29, for example, includes both end portions that extend straight and a middle portion thereof that extends in a zigzag manner. Such a first outboard shoulder sipe 29 can enhance stiffness of the outboard shoulder land portion 18A at the time that the sipe closes, improving steering stability of the tyre 1 on dry roads.

The inboard shoulder land portion 18B, for example, is provided with first inboard shoulder lateral grooves 31, second inboard shoulder lateral grooves 32, and first inboard shoulder sipes 33. Preferably, the first inboard shoulder lateral grooves 31 and the second inboard shoulder lateral grooves 32 are arranged alternately in the tyre circumferential direction. In this embodiment, two first inboard shoulder sipes 33 is arranged in each region between one first inboard shoulder lateral groove 31 and one second inboard shoulder lateral groove 32 which are adjacent in the tyre circumferential direction.

The first inboard shoulder lateral grooves 31, for example, extend axially inwardly from the inboard tread edge Ti and terminate within the inboard shoulder land portion 18B. In this embodiment, axial lengths L16 of the first inboard shoulder lateral grooves 31 are in a range of from 65% to 80% of an axial width W5 of the inboard shoulder land portion 18B. Such first inboard shoulder lateral grooves 31 can improve steering stability of the tyre 1 and on-snow performance in a well-balanced manner.

Preferably, the inboard shoulder land portion 18B is provided with second inboard shoulder sipes 34 which connect the first inboard shoulder lateral grooves 31 and the inboard shoulder longitudinal groove 16. Such second inboard shoulder sipes 34, while maintaining high stiffness of the inboard shoulder land portion 18B, can improve on-snow performance of the tyre 1 by offering the edge effect.

The second inboard shoulder lateral grooves 32, for example, extend axially inwardly from the inboard tread edge Ti and are connected to the inboard shoulder longitudinal groove 16. Thus, the second inboard shoulder lateral grooves 32 according to the embodiment traverse the inboard shoulder land portion 18B completely. Such second inboard shoulder lateral grooves 32 can compress snow therein and discharge it out of the inboard tread edge Ti, improving on-snow performance of the tyre 1.

The first inboard shoulder sipes 33, for example, extend axially inwardly from the inboard tread edge Ti and are connected to the inboard shoulder longitudinal groove 16. Thus, the first inboard shoulder sipes 33 according to the embodiment traverse the inboard shoulder land portion 18B completely.

Each first inboard shoulder sipe 33, for example, includes axially both end portions that extend straight and a middle portion thereof that extends in a zigzag manner. Such a first inboard shoulder sipe 33 can enhance stiffness of the inboard shoulder land portion 18B at the time that the sipe closes, improving steering stability of the tyre 1 on dry roads.

While the particularly preferable embodiments in accordance with the present disclosure have been described in detail, the present disclosure is not limited to the illustrated embodiments, but can be modified and carried out in various aspects.

EXAMPLE

Tyres having a basic tread pattern shown in FIG. 1 were prototyped based on the detail shown in Table 1. Then, steering stability and on-snow performance of each test tyres was tested. The common specification and the testing methods for the test tyres are as follows:

Tyre size: 215/60R16
Rim size: 16×6.5J
Tyre inner pressure: 240 kPa
Test vehicle: mid-size FF passenger car
Tyre location: all wheels Steering Stability Test:

A test driver drove the test vehicle to which each test tyre was attached on a dry road to evaluate the steering stability by the driver's sense. The test results are shown in Table 1 using an index where Ref 1 is set to 100. The larger value indicates better the steering stability.

On-Snow Performance Test:

A test driver drove the test vehicle to which each test tyre was attached on a snowy road to evaluate the steering stability by the driver's sense. The test results are shown in Table 1 using an index where Ref 1 is set to 100. The larger value indicates better the on-snow performance.

Table 1 shows the test results.

TABLE 1

|  | Ref. 1 | Ref. 2 | Ex. 1 | Ex. 2 | Ex. 3 | Ex. 4 | Ex. 5 |
|---|---|---|---|---|---|---|---|
| First and second lateral grooves | first lateral grooves only | presence | presence | presence | presence | presence | presence |
| Do first sipes traverse land portion? | No | Yes | No | No | No | No | No |
| Second and third sipes | second sipes only | presence | presence | none | presence | presence | presence |
| Relation between lengths L1 of first lateral grooves and lengths l2 of second lateral grooves | — | L1 > L2 | L1 > L2 | L1 > L2 | L1 < L2 | L1 > L2 | L1 > L2 |
| Relation between lengths L5 of first sipe elements and lengths L4 of third sipe elements | L5 > L4 | — | L5 > L4 | L5 > L4 | L5 > L4 | L5 < L4 | L5 > L4 |
| First edge location | Tyre equator side | Tyre equator side | Tyre equator side | Tyre equator side | Tyre equator side | Tyre equator side | Tread edge side |
| Steering stability (index) | 100 | 105 | 110 | 112 | 105 | 100 | 108 |
| On-snow performance (index) | 100 | 95 | 110 | 98 | 100 | 105 | 100 |

From the test results, it is confirmed that the example tyres, as compared with the comparative examples, improve steering stability on dry roads and on-snow performance in a well-balanced manner.

What is claimed is:

1. A tyre comprising:
a tread portion comprising a first land portion on a ground contacting surface of the tread portion, the first land portion having a circumferentially extending first edge and a circumferentially extending second edge on the ground contacting surface;
the first land portion being provided with first lateral grooves extending from the first edge and terminating within the first land portion, second lateral grooves extending from the second edge and terminating within the first land portion, and first sipes; and
each first sipe extending from a first end thereof opened at the second edge toward the first edge, and turning in a direction within the first land portion to extend to a second end thereof opened at the second edge at a different location from the first end;
wherein
each first sipe is not connected with any other sipes nor grooves provided on the first land portion such that each first sipe does not communicate with the first edge; and
the first land portion being further provided with second sipes connecting the first lateral grooves and the second edge.

2. The tyre according to claim 1, wherein
the first lateral grooves and the second lateral grooves are arranged alternately in a tyre circumferential direction.

3. The tyre according to claim 1, wherein
each first sipe is arranged between one first lateral groove and one second lateral groove which are adjacent in a tyre circumferential direction.

4. The tyre according to claim 1, wherein
each first sipe has a length in a tyre axial direction equal to or more than 50% of an axial width of the first land portion.

5. The tyre according to claim 1, wherein
each first sipe comprises a first sipe element extending from the first end, a second sipe element extending from the second end, and a third sipe element having an angle with respect to a tyre circumferential direction smaller than those of the first sipe element and the second sipe element.

6. The tyre according to claim 5, wherein
the third sipe element has a length in the tyre circumferential direction smaller than lengths in a tyre axial direction of the first sipe element and the second sipe element.

7. The tyre according to claim 5, wherein
the first sipe element and the second sipe element extend in parallel with each other.

8. The tyre according to claim 5, wherein
the first sipe element has an opposite end opposed to the first end,
the second sipe element has an opposite end opposed to the second end, and the third sipe element connects the opposite end of the first sipe element to the opposite end of the second sipe element.

9. The tyre according to claim 5, wherein
the first sipe element has a length in a tyre axial direction smaller than a length in the tyre axial direction of the second sipe element.

10. The tyre according to claim 1, wherein
lengths in a tyre axial direction of the second lateral grooves are smaller than lengths in the tyre axial direction of the first lateral grooves.

11. The tyre according to claim 1,
wherein
the tread portion has a designated mounting direction to a vehicle, and the first land portion is a middle land portion located on an outboard side of the tyre equator upon being mounted onto a vehicle;
wherein
the tread portion further comprises a crown land portion arranged on the tyre equator;
wherein
the crown land portion is defined between an outboard crown longitudinal groove that is adjacent to the middle land portion and an inboard crown longitudinal groove;
wherein
the crown land portion is provided with first crown lateral grooves extending from the outboard crown longitudinal groove which terminate within the crown land portion, and second crown lateral grooves extending from the inboard crown longitudinal groove which terminate within the crown land portion, and first crown sipes traversing the crown land portion; and
wherein
the first crown lateral grooves are continuous to the respective first lateral groove via the outboard crown longitudinal groove.

12. The tyre according to claim 1,
wherein
the first land portion being further provided with third sipes connecting the second lateral grooves and the first edge;
wherein
the tread portion has a designated mounting direction to a vehicle, and the first land portion is a middle land portion located on an outboard side of the tyre equator upon being mounted onto a vehicle;
wherein
the tread portion further comprises a crown land portion arranged on the tyre equator;
wherein
the crown land portion is defined between an outboard crown longitudinal groove that is adjacent to the middle land portion and an inboard crown longitudinal groove;
wherein
the crown land portion is provided with first crown lateral grooves extending from the outboard crown longitudinal groove which terminate within the crown land portion, and second crown lateral grooves extending from the inboard crown longitudinal groove which terminate within the crown land portion, and first crown sipes traversing the crown land portion;
the crown land portion being further provided with second crown sipes connecting the first crown lateral grooves and the inboard crown longitudinal groove, and third crown sipes connecting the second crown lateral grooves and the outboard crown longitudinal groove; and wherein
the third crown sipes are continuous to the respective third sipes via the outboard crown longitudinal groove.

13. A tyre comprising:
a tread portion comprising a first land portion on a ground contacting surface of the tread portion, the first land portion having a circumferentially extending first edge and a circumferentially extending second edge on the ground contacting surface;
the first land portion being provided with first lateral grooves extending from the first edge and terminating within the first land portion, second lateral grooves extending from the second edge and terminating within the first land portion, and first sipes; and
each first sipe extending from a first end thereof opened at the second edge toward the first edge, and turning in a direction within the first land portion to extend to a second end thereof opened at the second edge at a different location from the first end;
wherein
each first sipe is not connected with any other sipes nor grooves provided on the first land portion such that each first sipe does not communicate with the first edge; and
the first land portion being further provided with third sipes connecting the second lateral grooves and the first edge.

14. A tyre comprising:
a tread portion comprising a first land portion on a ground contacting surface of the tread portion, the first land portion having a circumferentially extending first edge and a circumferentially extending second edge on the ground contacting surface;
the first land portion being provided with first lateral grooves extending from the first edge and terminating within the first land portion, second lateral grooves extending from the second edge and terminating within the first land portion, and first sipes; and
each first sipe extending from a first end thereof opened at the second edge toward the first edge, and turning in a direction within the first land portion to extend to a second end thereof opened at the second edge at a different location from the first end;
wherein
each first sipe is not connected with any other sipes nor grooves provided on the first land portion such that each first sipe does not communicate with the first edge; and
the first land portion is a middle land portion arranged between a tyre equator and a tread edge, and the first edge is located on a tyre equator side of the first land portion.

15. The tyre according to claim 14, wherein
the tread portion has a designated mounting direction to a vehicle, and the middle land portion is located on an outboard side of the tyre equator, with the outboard side being further from a centerline of a vehicle to which the tyre is mounted.

16. The tyre according to claim 15,
the tread portion further comprising a crown land portion arranged on the tyre equator, wherein
the crown land portion is defined between an outboard crown longitudinal groove that is adjacent to the middle land portion and an inboard crown longitudinal groove, and
the crown land portion is provided with first crown lateral grooves extending from the outboard crown longitudinal groove which terminate within the crown land portion, and second crown lateral grooves extending from the inboard crown longitudinal groove which terminate within the crown land portion, and first crown sipes traversing the crown land portion.

17. The tyre according to claim 16, wherein
the first crown lateral grooves and the second crown lateral grooves are arranged alternately in the tyre circumferential direction,
axial lengths of the second crown lateral grooves are equal to axial lengths of the first crown lateral grooves, and
the axial lengths of the second crown lateral grooves and the first crown lateral grooves are equal to or less than 30% of an axial width of the crown land portion.

18. The tyre according to claim 16, wherein
the crown land portion being further provided with second crown sipes connecting the first crown lateral grooves and the inboard crown longitudinal groove, and third crown sipes connecting the second crown lateral grooves and the outboard crown longitudinal groove.

19. The tyre according to claim 16, wherein
the tread portion further comprising an inboard middle land portion, wherein
the inboard middle land portion is provided with inboard middle lateral grooves traversing the inboard middle land portion completely.

* * * * *